April 21, 1931.   J. C. McLEAN   1,801,282
ELECTRIC BATTERY
Filed Oct. 6, 1926

INVENTOR.
John C. McLean.
BY
Fay, Oberlin & Fay
ATTORNEYS.

Patented Apr. 21, 1931

1,801,282

UNITED STATES PATENT OFFICE

JOHN C. McLEAN, OF CLEVELAND, OHIO, ASSIGNOR TO THE M AND M COMPANY, OF CLEVELAND, OHIO, A CORPORATION OF OHIO

ELECTRIC BATTERY

Application filed October 6, 1926. Serial No. 139,838.

This invention relates to electric batteries and more particularly batteries having exposed terminals or connections. Where corrosive electrolytes are employed in such batteries and are spilled or creep over the terminals and connections, these become corroded, and more or less trouble ensues. For instance, notably with lead storage batteries as customarily employed in automobiles, the repairman very commonly finds that non-functioning in the circuit is due to advanced corrosion and incrustation. Similarly, with radio batteries, even a relatively small amount of corrosion and incrustation can interfere with requisite output voltage. Moreover with such batteries having large exposure of live connections and terminals, if a piece of metal or a tool for example, be accidentally laid on the top, as sometimes occurs with a battery in a poorly lighted location, a disastrous short-circuit is the result. A battery which would be exempt from such difficulties, and at the same time without necessitating radical change of form is accordingly highly desirable; and to the accomplishment of such and related ends, the present invention, then, consists in the features hereinafter fully described, and particularly pointed out in the claims, the following description and the annexed drawing setting forth in detail but one of the various ways in which the principle of the invention may be used.

In said annexed drawing:—

Figure 1:
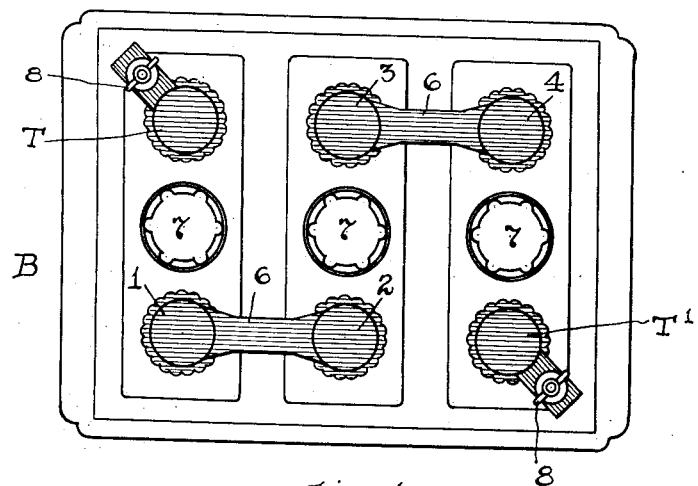
Figure 2:
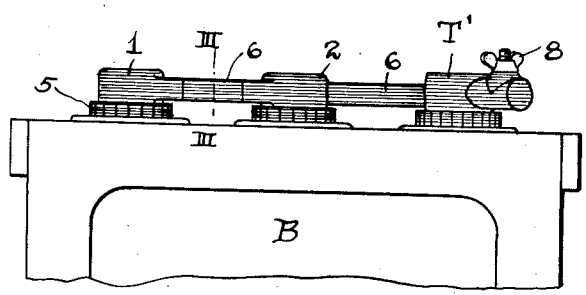
Figure 3:
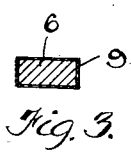

Fig. 1 is a plan view of a batery embodying my invention; Fig. 2 is a side elevation of the top portion of such battery; and Fig. 3 is a section on the line III—III, Fig. 2.

Referring more particularly to the drawing, the reference character B designates a battery, of any desired internal construction, having terminals T, T'. The form shown is a battery of lead plate secondary type, having three cells with cell terminals respectively T, 1, and 2, 3, and 4, T'. Washers 5 of lead, having the customary packing gaskets thereunder are arranged on the terminals, and cross-bar connections 6 extend from one cell terminal to the next, being secured to the terminals by lead-burning, or other usual or preferred manner. Arranged on ears projecting from the terminals T, T' are clamping nuts 8, such being of the type most advantageous for radio batteries for instance, and the screw threaded stems with which such nuts engage may be of brass for instance and cast in the lead of the terminal lug. Filling vents capped by screw threaded closures 7 are provided, as usual. The exposed current-carrying parts are coated with a coating 9 which sets to an adherent condition, and which may be made up of material affording a non-corrosion protective coat. Advantageously at the same time the property of electrical insulation may be provided by requisite selection of material. A lacquer of shellac base for instance dissolved in alcohol or usual vehicle, and containing besides, if desired, a proportion of boiled linseed oil or the like, may be used. Preferably however, I employ a lacquer of nitro-cellulose base, the nitro-cellulose being dissolved to desired state of fluency in amyl acetate or other preferred solvent, and with or without the addition of a small proportion of shellac or the like, and the desired coloring agent. In some cases, I apply a coating of one color to one terminal and a different color to the other terminal of a battery, and the cross bar connectors may be of a different color also. For instance, the positive terminal may be coated with the protective coating having a red coloration, and the negative terminal may be provided with a protective coating having black coloration, and the cross bar connections may be protected by a coating of green color. Various combinations in this respect may of course be had while securing the advantages of the protective coatings. Where brass thumb nuts are used, these may likewise be coated along with the entire surface of the terminal, but in some instances I contemplate the omission of the particular coating from the brass surface, applying it only to the lead, since it is this in particular which occasions trouble in battery usage.

I am aware that it has been proposed to apply vaseline to the terminals of batteries, but this is not to be confused with the present invention, the vaseline in such connection not constituting a definitely formed coat and being readily removed, in fact tending to run off on exposure to more or less elevated temperatures, and not only lacking the essentials of a protective coating but being beside detrimental in its marked tendency to attract dust and dirt. In accordance with the present invention however, a definite coating of sufficient toughness and body may be provided, to give a permanent character irrespective of temperatures to which the battery may be exposed in the course of use, and not only may the surfaces liable to corrosion from the creeping electrolyte be adequately protected and the life and utility of the terminals correspondingly prolonged, but at the same time by reason of its insulative property, the coating may protect against accidental short circuiting from contact with metallic articles which might happen to be placed on top of the battery. The advantages of my invention may be realized in proportional extent with batteries having more or less exposure of live parts, but the more specially marked advantages will be had in connection with lead plate secondary type batteries for automobile and radio usage.

Other modes of applying the principle of my invention may be employed, change being made as regards the features disclosed, provided the means or steps stated in any of the following claims or the equivalent of such be used.

I therefore particularly point out and distinctly claim as my invention:—

1. An electric battery having its exposed current-carrying parts protected by an adherent nitro-cellulose anti-corrosion insulative coating.

2. A lead-plate secondary battery having its exposed connector bars and terminals protected by an adherent cellulose-base insulative coating.

3. A lead-plate secondary battery having its exposed connector bars and terminals protected by a nitro-cellulose coating.

Signed by me this 4th day of October, 1926.

JOHN C. McLEAN.